US006746772B2

(12) United States Patent
Kashiba et al.

(10) Patent No.: US 6,746,772 B2
(45) Date of Patent: Jun. 8, 2004

(54) OXYGEN-ABSORBING MULTI-LAYER FILM

(75) Inventors: Takashi Kashiba, Kanagawa (JP); Shuta Kihara, Kanagawa (JP); Takaaki Kutsuna, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/175,910

(22) Filed: Jun. 21, 2002

(65) Prior Publication Data
US 2003/0003308 A1 Jan. 2, 2003

(30) Foreign Application Priority Data
Jun. 27, 2001 (JP) ........................................ 2001-194487

(51) Int. Cl.⁷ .............................................. B32B 27/38
(52) U.S. Cl. ........................ 428/414; 428/413; 428/500; 428/523
(58) Field of Search ................................ 428/413, 414, 428/500, 523; 525/523, 524, 526; 528/124, 407

(56) References Cited

U.S. PATENT DOCUMENTS

| 4,541,958 A | | 9/1985 | Miyamoto et al. | |
| 5,274,024 A | * | 12/1993 | Koyama et al. | 524/440 |
| 6,309,757 B1 | * | 10/2001 | Carlblom et al. | 428/480 |
| 2002/0120063 A1 | * | 8/2002 | Kutsuna et al. | 525/107 |

FOREIGN PATENT DOCUMENTS

| EP | 0884 173 A2 | 12/1998 |
| WO | WO 96/18669 | 6/1996 |

* cited by examiner

Primary Examiner—David J. Buttner
Assistant Examiner—Christopher Keehan
(74) Attorney, Agent, or Firm—Antonelli, Terry, Stout & Kraus, LLP

(57) ABSTRACT

There is disclosed an oxygen-absorbing multi-layer film which comprises an outer layer comprising a thermoplastic resin; an adhesive layer comprising an epoxy resin; an oxygen-absorbing layer comprising a thermoplastic resin and an iron based oxygen-absorbing agent incorporated therein; and a heat sealing layer comprising an oxygen-permeable thermoplastic resin, wherein the adhesive layer comprises a gas barrier epoxy resin composition containing at least 30% by weight, preferably 40 to 90% by weight of a xylylenediamine unit ($N-CH_2-C_6H_4-CH_2-N$). The multi-layer film preferably having an overall thickness of at most 120 micron is excellent in oxygen-absorbing function, gas barrier properties, impact resistance, film rigidity and economical efficiency, and is well suited for use as packaging materials for food, pharmaceutical and the like.

20 Claims, No Drawings

OXYGEN-ABSORBING MULTI-LAYER FILM

BACKGROUND OF THE INVENTION

1. Field of the Invention

The present invention relates to an oxygen-absorbing multi-layer film used in packaging materials for food, pharmaceutical and the like that are intended for the preservation of contents in packages by oxygen absorption.

2. Description of the Related Arts

In recent years, there have been prevalently used plastic films and plastic containers in packaging materials intended for the preservation of contents in packages by reason of their light weight, economical efficiency and the like. Performances required of the plastic films that are used for packaging food, pharmaceutical, cosmetics and the like include gas barrier properties against a variety of gases, transparency, resistance to retorting treatment, impact resistance, flexibility, heat sealability. Of these, high gas barrier properties against oxygen and steam are required in particular under the conditions of high humidity, after retorting treatment for the purpose of preserving the performances and properties of the contents in packaging materials.

On the other hand, for the purpose of preserving food, pharmaceutical and the like, there are used an deoxidant in which an iron based oxygen-absorbing agent is packaged in an gas permeable packaging material and an deoxidant of label type, packing type or card type in which an oxygen-absorbing resin composition composed of a thermoplastic resin and an oxygen-absorbing agent compounded therewith is packaged in an gas permeable packaging material. Further as one of deoxidizing packaging techniques, deoxidizing containers are under development, including a packaging container comprising multi-layer materials which are equipped with an oxygen-absorbing layer having a resin composition composed of a thermoplastic resin and an oxygen-absorbing agent compounded therewith, and which are imparted with deoxidizing function.

As an oxygen-absorbing resin composition composed of a resin and an iron based oxygen-absorbing agent compounded therewith, there is described an iron based oxygen-absorbing agent dispersed in and mixed with a thermoplastic resin in Japanese Patent Application Laid-Open Nos. 158257/1985 (Showa 60), 281964/1988 (Showa 63), 90847/1992 (Heisei 4), 268140/1995 (Heisei 7), etc. There is described an oxygen-absorbing multi-layer body such as a multi-layer sheet, multi-layer film and the like each having an iron based oxygen-absorbing resin layer in Japanese Patent Application Laid-Open Nos. 72941/1996 (Heisei 8), 309323/1995 (Heisei 7) and 40024/1997 (Heisei 9).

In general, an oxygen-absorbing multi-layer body is composed by laminating each of film materials which constitute a protective outer layer, a gas barrier layer, an oxygen-absorbing layer and a sealant layer, respectively, wherein the adhesion between the gas barrier layer and oxygen-absorbing layer is made by extrusion lamination or dry lamination. However the oxygen-absorbing multi-layer body comprising a gas barrier layer, an adhesive layer, an oxygen-absorbing layer and a sealant layer inevitably causes an increase in total thickness owing to the presence of the oxygen absorbing layer as compared with a conventional gas barrier film as mentioned above, thus bringing about deterioration in flexibility of the resultant laminate.

As materials which have gas barrier properties and constitute a gas barrier layer, there are known polyvinylidene chloride (PVDC) films, ethylene-vinyl alcohol copolymer (EVOH resin) films, polyvinyl alcohol (PVA) films, meta-xylylene adipamide films, inorganic vapor deposited films that are deposited with alumina ($Al_2O_3$), silica (SiOx) aluminum foils. The above-exemplified materials are properly selectively employed according to the characteristics separately by the type of content and the purpose of use. In the case of laminating an oxygen-absorbing layer with a material having gas barrier properties, there are used a dry lamination method which comprises coating a material having gas barrier properties with an adhesive, and allowing an oxygen-absorbing layer to adhere thereto, an extrusion lamination method which comprises coating a material having gas barrier properties with an anchor coating agent at need and press bonding a molten resin composition layer functioning as an oxygen-absorbing layer thereonto to produce a filmy laminate. As the adhesive and anchor coating agent, there is prevalently used a two-component polyurethane adhesive composed of a principal ingredient bearing an active hydrogen group such as hydroxyl group and a curing agent bearing an isocyanate group from the standpoint of sufficient adhesivity {for instance, refer to Japanese Patent Application Laid-Open No. 316442/1997 (Heisei 9)}.

That is to say, the conventional oxygen-absorbing multi-layer body has suffered from a disadvantage from the aspects of economical efficiency, workability in production steps because of the necessity of separately installing a layer which assumes a role of allowing an adhesive layer or anchor coat layer to adhere between the gas barrier layer and the oxygen-absorbing layer.

SUMMARY OF THE INVENTION

A general object of the present invention is to eliminate the problems as mentioned hereinbefore, and thus to provide an oxygen-absorbing multi-layer film which has oxygen-absorbing function, which is excellent in economical efficiency, film rigidity and contents preservability and which is used in packaging materials for food, pharmaceutical and the like.

Other objects thereof will become obvious from the text of this specification hereinafter disclosed.

As a result of intensive research and investigation made by the present inventors it has been found that there is obtainable a laminated film which is excellent in a variety of performances such as gas barrier properties, interlaminar adhesivity, resistance to retorting treatment, impact resistance and flexibility as well as economical efficiency by using a cured product formed with a specific component as an epoxy base resin adhesive between an outer layer and an oxygen-absorbing layer. The present invention has been accomplished by the foregoing findings and information.

Specifically, the present invention relates to an oxygen-absorbing multi-layer film which comprises an outer layer comprising a thermoplastic resin; an adhesive layer comprising an epoxy resin; an oxygen-absorbing layer comprising a thermoplastic resin and an iron based oxygen-absorbing agent incorporated therein; and a heat sealing layer comprising an oxygen-permeable thermoplastic resin, wherein said adhesive layer comprises a gas barrier epoxy resin composition containing at least 30% by weight of a xylylene diamine unit.

In particular, the present invention pertains to the above-mentioned oxygen-absorbing multi-layer film wherein said gas barrier epoxy resin composition comprises an epoxy resin containing xylylene diamine units.

In particular, the present invention is concerned with the above-mentioned oxygen-absorbing multi-layer film wherein said gas barrier epoxy resin composition is formed by curing an epoxy resin with an epoxy resin curing agent, said epoxy resin curing agent containing a xylylene diamine unit.

DESCRIPTION OF THE PREFERRED EMBODIMENTS

In the following, detailed description will be given of the oxygen-absorbing multi-layer film according to the present invention.

The outer layer usable in the present invention comprises a thermoplastic resin as far as it can be coated with an adhesive layer, and is exemplified by films of polyolefin base such as polyethylene and polypropylene, films of polyester base such as polyethylene terephthalate, films of polyamide base such as nylon 6 and nylon 6,6, poly(meth)acrylic base films, polystyrenic base films, ethylene-vinyl aicohol copolymer (EVOH) base films and polyvinyl alcohol base films. Of these are preferable polyolefin base films, polyester base films and polyamide base films.

These films are preferably oriented uniaxially or biaxially and the practical thickness thereof is in the range of about 10 to 300 micron, preferably about 10 to 100 micron.

Preferably, the outer layer surface to be coated with the adhesive comprising the epoxy resin composition is subjected to any of various surface treatments such as flame treatment and corona discharge treatment so as to form the adhesive layer free from a defect or a repellent. Such treatment promotes favorable adhesion of the adhesive layer onto the outer layer. In addition, a printing layer can be equipped after a suitable surface treatment is given on the outer layer surface. In the case of installing a printing layer, it is possible to apply general printing equipment as well which has heretofore been used for printing polymer films such as a gravure printing press, a flexographic press and an offset printing press. Moreover regarding an ink constituting the printing layer, it is possible to apply a conventional ink which has heretofore been used for printing polymer films and which comprises a pigment of such as azo base or phthalocyanine; a resin such as rosin, polyamide resin and polyurethane resin; and a solvent such as methanol, ethyl acetate and methyl ethyl ketone.

The adhesive layer in the present invention comprises a gas barrier epoxy resin composition containing at least 30% by weight of a xylylenediamine unit (N—$CH_2$—$C_6H_4$—$CH_2$—N). The adhesive layer comprises a heat-curable type cured reaction product from an epoxy resin and a curing agent for the epoxy resin both or either of which contains the xylylenediamine units. Preferably, the cured reaction product contains the xylylenediamine units in both the epoxy resin and the epoxy resin curing agent.

The amide group moiety contained in the adhesive layer in the present invention has a strong aggregative force. Thus the presence of the amide group moiety of a high proportion in the epoxy resin curing agent enables higher oxygen barrier properties and favorable adhesive strength for flexible polymer films.

The upper limit of the xylylenediamine unit content is preferably 95%, more preferably 90% by weight based on the epoxy resin composition. An unreasonably high content of the xylylenediamine unit sometimes leads to insufficient adhesivity.

The adhesive layer in the present invention manifests favorable adhesivity between the outer layer comprising a thermoplastic resin and the oxygen-absorbing layer or an intermediate layer, and further possesses high gas barrier properties. The oxygen permeation coefficient of the adhesive layer under the conditions of a temperature of 23° C. and a relative humidity of 60% is at most 0.1 cc·mm/$m^2$·day·atm, and the oxygen permeability of the outer layer coated with an adhesive under the conditions of a temperature of 23° C. and a relative humidity of 60% is at most 20 cc·mm/$m^2$·day·atm irrespective of the type of the outer layer. In the following, detailed description will be given of the epoxy resin and the epoxy resin curing agent.

The epoxy resin may be any of an aliphatic compound, alicyclic compound, aromatic compound and heterocyclic compound each being saturated or unsaturated. In the case of taking into consideration the manifestation of high gas barrier properties, the epoxy resin preferably bears an aromatic ring in a molecule.

Specific examples of usable epoxy resin include epoxy resin of tetraglycidylamine type of meta-xylylenediamine, epoxy resin of tetraglycidylamine type of 1,3-bis (aminomethyl)cyclohexane, epoxy resin of tetraglycidylamine type of diaminodiphenylmethane, epoxy resin of triglycidyl type of para-aminophenol, epoxy resin of diglycidyl ether type of bisphenol A, epoxy resin of diglycidyl ether type of bisphenol F, epoxy resin of phenol novolak type and epoxy resin of diglycidyl ether type of resorcinol. It is preferable in particular to use epoxy resin of tetraglycidylamine type of meta-xylylenediamine as an epoxy resin component.

Further, the above-exemplified various epoxy resins may be mixed at a proper proportion in order to enhance various properties such as impact resistance, flexibility and resistance to humid heat.

The foregoing epoxy resin curing agent is composed principally of the reaction product between meta-xylylenediamine or para-xylylenediamine and a polyfunctional compound which can form an amide group moiety by the reaction with an amine and thus can form an oligomer and which bears at least one acyl group, or said agent is composed principally of the reaction product among meta-xylylenediamine or para-xylylenediamine, a polyfunctional compound which can form an amide group moiety by the reaction with an amine and thus can form an oligomer and which bears at least one acyl group, and a monobasic carboxylic acid having 1 to 8 carbon atoms and/or a derivative thereof.

The epoxy resin curing agent can be produced as an amide compound which has a plurality of amide bonds and which results from condensation reaction of the under-mentioned components (A) and (B), or as the reaction product among the under-mentioned components (A), (B) and (C).

(A) meta-xylylenediamine or para-xylylenediamine.

(B) polyfunctional compound which can form an amide group moiety by the reaction with an amine and thus can form an oligomer and which bears at least one acyl group.

(C) monocarboxylic acid having 1 to 8 carbon atoms and/or a derivative thereof.

The aforesaid amide compound may form an oligomer by addition polymerization or polycondensation.

The above-mentioned polyfunctional compound which can form an amide group moiety by the reaction with an amine and thus can form an oligomer and which bears at least one acyl group is exemplified by an unsaturated carboxylic acid and polycarboxylic acid such as acrylic acid, methacrylic acid, maleic acid, fumaric acid, succinic acid, tartaric acid, adipic acid, isophthalic acid, terephthalic acid, pyromellitic acid and trimellitic acid. There are also usable derivatives of unsaturated carboxylic acid and polycarboxylic acid, for instance, esters, amides, acid anhydrides and acid chlorides thereof. Of these, are preferable in particular, acrylic acid, methacrylic acid, esters thereof, amides and acid anhydrides.

With regard to the blending ratio in the reaction between meta-xylylenediamine or para-xylylenediamine and an unsaturated carboxylic acid or a polycarboxylic acid which can form an amide group moiety by the reaction with an amine, and thus can form an oligomer, the molar ratio of carboxyl groups of the unsaturated carboxylic acid or a polycarboxylic acid to amino groups of the meta-xylylenediamine or para-xylylenediamine is preferably in the range of 0.3 to 0.95.

In addition, there may be used an amide compound formed by the reaction of a diamine by simultaneously using the above-mentioned unsaturated carboxylic acid or a polycarboxylic acid with a monocarboxylic acid having 1 to 8 carbon atoms such as formic acid, acetic acid, propionic acid, butyric acid, lactic acid, glycol acid and benzoic acid and derivatives thereof, for instance, esters, amides, acid anhydrides and acid chlorides thereof.

Further, the above exemplified various epoxy resin curing agent may be mixed at a proper proportion in order to enhance various properties such as impact resistance, flexibility and resistance to humid heat.

The content of the xylylenediamine unit ($N-CH_2-C_6H_4-CH_2-N$) in the epoxy resin composition which constitutes the heat curable gas barrier adhesive layer in the present invention is at least 30%, preferably at least 40%, more preferably at least 50% by weight based on the weight of cured epoxy resin. It is preferable that the terminal of the xylylenediamine unit forms an amide group moiety together with an acyl group.

The xylylenediamine unit contained in the adhesive layer in the present invention has a strong aggregative force. Thus the presence of the xylylenediamine unit of a high proportion in the epoxy resin curing agent enables higher oxygen barrier properties and favorable adhesive strength for flexible polymer films.

The upper limit of the xylylenediamine unit content is preferably 95%, more preferably 90% by weight. An unreasonably high content of the xylylenediamine unit sometimes leads to insufficient adhesivity.

The blending ratio of the epoxy resin forming the adhesive layer to the epoxy resin curing agent may be generally within a standard blending scope in the case of producing a cured epoxy resin by the reaction of the epoxy resin and the epoxy resin curing agent. Specifically, the ratio of the number of active hydrogens in the epoxy resin curing agent to the number of epoxy groups in the epoxy resin is in the range of 0.5 to 5.0, preferably 0.8 to 3.0.

The adhesive layer in the present invention is formed by preparing a coating solution of an epoxy resin composition containing the epoxy resin and the epoxy resin curing agent as the coating-forming component, applying the resultant coating solution onto the surface of an outer layer or oxygen-absorbing layer each comprising a thermoplastic resin, and as necessary, drying or heat treating the coated surface. The preparation of the coating solution is carried out at a concentration of the epoxy resin composition sufficient for producing the cured epoxy resin, but the aforesaid concentration thereof can vary depending upon the selection of starting materials. That is to say, the concentration can assume a variety of states depending on the type and molar ratio of the selected starting materials, including nonuse of a solvent, use of a certain type of proper organic solvent and/or water so as to achieve a concentration of about 5% by weight.

Examples of the proper organic solvent include glycol ethers such as 2-methoxyethanol, 2-ethoxyethanol, 2-propoxyethanol, 2-butoxyethanol, 1-methoxy-2-propanol, 1-ethoxy-2-propanol and 1-propoxy-2-propanol; alcohols such as methanol, ethanol, 1-propanol, 2-propanol, 1-butanol and 2-butanol; aprotic polar solvents such as N,N-dimethylformamide, N,N-dimethylacetamide, dimethylsulfoamide and N-methylpyrrolidone; and water-insoluble solvents such as toluene, xylene and ethyl acetate. Of these, are preferable the solvents each having a relatively low boiling point such as methanol and ethyl acetate.

In the case of applying a coating solution to the outer layer or oxygen-absorbing layer each comprising a thermoplastic resin, the coating solution according to the present invention may be incorporated with a wetting agent such as silicone or an acrylic compound in order to assist the wettability of the substrate surface. Proper wetting agent is exemplified by BYK331, BYK333, BYK348 and BYK381 each available from BYK-Chemie GmbH. In the case of adding the wetting agent, the amount to be added is preferably in the range of 0.01 to 2.0% by weight based on the overall weight of cured reaction product which becomes a gas barrier layer.

In order to enhance the various performances such as gas barrier properties and impact resistance for the oxygen-absorbing multi-layer film according to the present invention, the epoxy resin composition may be incorporated with an inorganic filler such as silica, alumina, mica, talc, aluminum flake and glass flake. Preferably, such inorganic filler is in the form of flat sheet. In the case of adding the inorganic filler, the amount to be added is preferably in the range of 0.01 to 10.0% by weight based on the overall weight of the resin composition after the completion of the curing reaction.

As the coating system in the case of applying the coating solution according to the present invention to the outer layer or oxygen-absorbing layer each comprising a thermoplastic resin, any of the generally used coating system is applicable thereto, including roll coating, spray coating, air knife coating, dipping and brush coating. Of these, roll coating and spray coating are preferable. For instance, there are applicable general techniques and installations for roll coating and spray coating intended for applying curable coating components.

Since the epoxy base adhesive to be used in the present invention has a fast rate of curing reaction, there is no need of post-curing for assuring sufficient adhesivity after lamination by means of aging.

As the thickness of the adhesive layer after the outer layer or oxygen-absorbing layer comprising a thermoplastic resin is coated, dried and heat treated, the lower limit thereof is 0.1 micron, preferably 0.5 micron, while the upper limit thereof is 20 micron, preferably 10 micron from the practical viewpoint. The thickness, when being less than 0.1 micron, leads to difficulty in exhibiting gas barrier properties, whereas the thickness, when being more than 20 micron, gives rise to loss of flexibility and unevenness of film thickness.

The cause for favorable adhesive strength being manifested between the thermoplastic resin and oxygen-absorbing layer lies in the strong mutual action of a large number of functional groups present in cured epoxy resin which forms the adhesive layer with the surfaces of each of the layers. Since the cured epoxy resin in the present invention which forms the adhesive layer is excellent in toughness and resistances to moisture and heat, makes it possible to assure oxygen-absorbing multi-layer films excellent in impact resistance, resistance to heat treatment and the like. Besides, the resultant multi-layer films can be made into thin-film product excellent in flexibility and bag producing characteristics.

The oxygen-absorbing layer in the oxygen-absorbing multi-layer film according to the present invention is produced by blending an iron based oxygen-absorbing agent in the thermoplastic resin. The amount of the iron based oxygen-absorbing agent to be blended in the thermoplastic resin is in the range of 10 to 80% by weight, preferably 20 to 70% by weight based on the oxygen-absorbing resin composition. An amount thereof, when being more than 80% by weight, gives rise to such a problem as processability of the resin composition, whereas an amount thereof, when being less than 10% by weight, leads to deterioration in oxygen-absorbing performance. The thickness of the oxygen-absorbing layer is in the range of preferably 1 to 200 micron, more preferably 5 to 100 micron.

The types of iron powders to be used for the iron based oxygen-absorbing agent in the present invention are not specifically limited, but may be selected for use from reduced iron powders, atomized iron powders and electrolytic iron powders. The particle size of the iron powders to be used for the iron based oxygen-absorbing agent is preferably smaller for the purpose of thinning the oxygen-absorbing resin layer. Thus the average particle size thereof is in the range of preferably 1 to 150 micron, particularly preferably 5 to 100 micron.

Preferably, the iron based oxygen-absorbing agent is a mixture of the above-mentioned iron powders and a metal halide. A metal halide catalytically acts on oxygen-absorbing reaction of iron powders. Examples of the metal halide include a chloride, a bromide or an iodide each of an alkali metal or an alkaline earth metal. Of these, a chloride, bromide or an iodide each of lithium, sodium, potassium, magnesium, calcium or barium is preferable. The blending amount of any of the metal halide is in the range of preferably 0.1 to 20 parts by weight, more preferably 0.1 to 5 parts by weight per 100 parts by weight of the iron powders.

The aforesaid metal halide is used as an indispensable ingredient along with iron powders in the oxygen-absorbing agent composed principally of iron powders. Preferably, the metal halide is premixed prior to the addition thereto so as to adhere to the iron powders without being easily separated therefrom. There are available various methods including a method in which the metal halide and iron powders are mixed with each other by means of a ball mill, speed mill or the like; a method in which the metal halide is embedded in a dent on the surface of iron powders; a method in which the metal halide is stuck onto the surface of iron powders by means of a binder; a method in which aqueous solution of the metal halide is mixed with iron powders, and the resultant mixture is dried and stuck onto the surface of iron powders; and the like methods.

Favorable iron based oxygen-absorbing agents to be used in the present invention include a composition which comprises the iron powders and the metal halide, particularly preferably an oxygen-absorbing agent which comprises iron powders coated with the metal halide in which the metal halide is stuck onto the iron powders. The foregoing oxygen-absorbing resin composition according to the present invention may be incorporated with a component other than the iron powders and the metal halide.

As the thermoplastic resin to be blended with the iron based oxygen-absorbing agent in the present invention, a polyolefin is preferably used. Examples of polyolefins include polyethylenes exemplified by low density polyethylene, medium density polyethylene, linear low density polyethylene and high density polyethylene; polypropylenes exemplified by propylene homopolymer, propylene-ethylene block copolymer and propylene-ethylene random copolymer; polyolefins by a metallocene catalyst such as metallocene polyethylene and metallocene polypropylene; elastomers exemplified by polymethylpentene, ethylene-vinyl acetate copolymer and ethylene-α-olefin copolymer; and a mixture thereof. Of these are particularly preferable propylene-ethylene random copolymer, propylene-ethylene block copolymer, low density polyethylene, linear low density polyethylene and metallocene polyethylene.

In the present invention, it is possible to install an intermediate layer comprising a thermoplastic resin not containing an oxygen-absorbing agent between the adhesive layer and the oxygen-absorbing layer in order to absorb the roughness of the surface of the oxygen-absorbing layer containing an oxygen-absorbing agent and to enhance interlaminar adhesive strength. The resin to be used in the intermediate layer is preferably of the same type as the above-mentioned resin used in the oxygen-absorbing layer in consideration of the compatibility with the oxygen-absorbing layer. The thickness of the intermediate layer is in the range of preferably 10 to 50 micron, more preferably 15 to 40 micron.

The heat sealing layer which constitutes part of the oxygen-absorbing multi-layer film according to the present invention is a portion made into a sealant, when the oxygen-absorbing multi-layer film is utilized for part or whole of a packaging container. It also plays roles as an isolation layer in isolating accommodated articles from the oxygen-absorbing layer and also as an oxygen permeable layer which efficiently permeates oxygen so that the oxygen in the packaging container is rapidly absorbed onto the deoxidizing agent in the oxygen-absorbing layer.

In the heat sealing layer which constitutes part of the oxygen-absorbing multi-layer film according to the present invention, any of thermoplastic resins is usable without specific limitation with the proviso that the resin is capable of fulfilling the role of thermal fusion and also permeating oxygen. Examples of such resins include polyethylenes exemplified by low density polyethylene, linear low density polyethylene, superlow density polyethylene and polyethylene by a metallocene catalyst; ethylene-vinyl acetate copolymer; ionomers; ethylene-methyl acrylate copolymer; ethylene-ethyl acrylate copolymer; ethylene- acrylic acid copolymer; ethylene-methacrylic acid copolymer; ethylene-methyl methacrylate copolymer; polypropylenes such as propylene homopolymer, propylene-ethylene block copolymer, propylene-ethylene random copolymer; and polypropylene by a metallocene catalyst; polymethylpentene; and thermoplastic elastomers. The above-exemplified resin may be used alone or in combination with at least one other.

The heat sealing layer may be incorporated with an additive such as a coloring pigment (e.g. titanium dioxide), antioxidant, slipping agent, antistatic agent and stabilizer, a filler such as calcium carbonate, clay, mica and silica, and a deodorant.

The film thickness of the heat sealing layer which constitutes part of the oxygen-absorbing multi-layer film according to the present invention is in the range of preferably 10 to 100 micron, more preferably 20 to 60 micron. The film thickness thereof, when being less than 10 micron, unfavorably causes the deoxidizing agent in the oxygen-absorbing layer to be exposed to the surface, or unfavorably brings about deterioration in heat sealing strength, whereas the thickness thereof, when being more than 100 micron, unfavorably leads to difficulty in lamination, deterioration in oxygen permeability causing deterioration in oxygen-absorbing performance and besides, an increase in a production cost.

The total thickness of the oxygen-absorbing multi-layer film according to the present invention can be made to be preferably at most 125 micron, more preferably at most 120 micron.

The oxygen-absorbing multi-layer film according to the present invention need not be separately equipped with a gas barrier layer which constitutes part of the laminated film, thereby rendering itself advantageous from the viewpoints of economical efficiency and processability in production step. Besides, the oxygen-absorbing multi-layer film according to the present invention is excellent in not only oxygen-absorbing function but also various performances including flexibility, impact resistance and resistance to retorting treatment along with interlaminar adhesivity at a practical level, whereby it is favorably applicable as a packaging material to keep the content such as food, pharmaceutical, etc. off from oxygen.

Furthermore, the oxygen-absorbing multi-layer film according to the present invention can be produced with a small total thickness and favorable flexibility. Accordingly, it is advantageous as a packaging container in respect of economical efficiency, easiness in handling as bags, workability at the time of packaging a content thereinto and easy openability.

The oxygen-absorbing multi-layer film according to the present invention is used for the preservation of goods such as food and pharmaceutical by packaging it with heat-sealing method. The package is preferably heated at 85 to 150° C. to sterilize and deoxidize the content. The time of heating is preferably 1 to 60 minutes. In the following, the present invention will be described in more detail with reference to comparative examples and working examples, which however shall never limit the present invention thereto.

Coating Solution 1

One mol of meta-xylylenediamine was charged in a vessel type reactor. Then the reactor was heated in a stream of nitrogen to raise the temperature up to 60° C., and 0.67 mol of methyl acrylate was added dropwise thereto over a period of one hour. After the completion of the dropwise addition, the content therein was stirred at 120° C. for one hour, and further heated for 3 hours to raise the temperature up to 180° C., while produced methanol was distilled away. Subsequently, the content therein was allowed to cool down to 100° C., and a prescribed amount of methanol was added thereto so as to achieve solid concentration of 70% by weight. Thus there was obtained epoxy resin curing agent A which was an oligomer bearing amide group moiety. There was prepared a solution of 60 parts by weight of epoxy resin of tetraglycidylamine type of meta-xylylenediamine (manufactured by Mitsubishi Gas Chemical Co., Inc. under the trade name"TETRAD-X") and 90 parts by weight of the epoxy resin curing agent A, each dissolved in a mixed solvent of methanol I ethyl acetate at a ratio of 1:1 (solid concentration of 30% by weight). To the resultant solution was added 0.02 part by weight of acrylic base wetting agent (manufactured by BYK-Chemi GmbH. Under the trade name "BYK 381") with sufficient stirring to obtain a coating solution of adhesive 1.

Coating Solution 2

One mol of meta-xylylenediamine was charged in a vessel type reactor. Then the reactor was heated in a stream of nitrogen to raise the temperature up to 60° C., and 0.50 mol of methyl acrylate was added dropwise thereto over a period of one hour. After the completion of the dropwise addition, the content therein was stirred at 120° C. for one hour, and further heated for 3 hours to raise the temperature up to 180° C., while produced methanol was distilled away. Subsequently, the content therein was allowed to cool down to 100° C., and thus there was obtained epoxy resin curing agent B which was an oligomer bearing amide group moiety. There was prepared a solution of 50 parts by weight of epoxy resin of tetraglycidylamine type of meta-xylylenediamine (manufactured by Mitsubishi Gas Chemical Co., Inc. under the trade name"TETRAD-X") and 66 parts by weight of the epoxy resin curing agent B, each dissolved in a mixed solvent of methanol/ethyl acetate at a ratio of 1:1 (solid concentration of 30% by weight). To the resultant solution was added 0.02 part by weight of acrylic base, wetting agent (manufactured by BYK-Chemi GmbH under the trade name "BYK 381") with sufficient stirring to obtain a coating solution of adhesive 2.

Coating Solution 3

One mol of meta-xylylenediamine was charged in a vessel type reactor. Then the reactor was heated in a stream of nitrogen to raise the temperature up to 120° C., and 0.50 mol of methyl acrylate was added dropwise thereto over a period of one hour, with stirring at 120° C. for 0.5 hour. Further, 0.17 mol of malic acid was added little by little to the content therein with stirring for 0.5 hour. The content was heated for 3 hours to raise the temperature up to 180° C., while produced water and methanol were distilled away. Subsequently, the content therein was allowed to cool down to 100° C., and a prescribed amount of methanol was added thereto so as to achieve solid concentration of 70% by weight. Thus there was obtained epoxy resin curing agent C which was an oligomer bearing amide group moiety. There was prepared a solution of 50 parts by weight of epoxy resin of tetraglycidylamine type of meta-xylylenediamine (manufactured by Mitsubishi Gas Chemical Co.,Inc. under the trade name"TETRAD-X") and 100 parts by weight of the epoxy resin curing agent C, each dissolved in a mixed solvent of methanol/ethyl acetate at a ratio of 1:1 ( solid concentration of 30% by weight). To the resultant solution was added 0.02 part by weight of acrylic base wetting agent (manufactured by BYK-Chemie GmbH under the trade name "BYK 381") with sufficient stirring to obtain a coating solution of adhesive 3.

Coating Solution 4

There was prepared a solution of 70 parts by weight of epoxy resin curing agent (manufactured by Mitsubishi Gas Chemical Co.,Inc. under the trade name "Gaskamine 340") which was a reaction product of meta-xylylenediamine and methyl methacrylate in a molar ratio of approximately 2:1 and which was dissolved in a mixed solvent of methanol/ ethyl acetate at a ratio of 1:1 (solid concentration of 30% by weight); 50 parts by weight of epoxy resin of tetraglycidylamine type of meta-xylylenediamine (manufactured by Mitsubishi Gas Chemical Co.,Inc. under the trade name"TETRAD-X"); and 0.02 part by weight of acrylic base wetting agent (manufactured by BYK-Chemie GmbH under the trade name "BYK 381") with sufficient stirring to obtain a coating solution of adhesive 4.

Coating Solution 5

There was prepared a solution of 50 parts by weight of epoxy resin of diglycidyl ether type of bisphenol F (manufactured by Japan Epoxy Resin Co.,Inc. under the trade name "Epicoat 807") and 64 parts by weight of epoxy resin curing agent A, each dissolved in a mixed solvent of methanol/ethyl acetate at a ratio of 1:1 ( solid concentration of 30% by weight). To the resultant solution was added 0.02 part by weight of acrylic base wetting agent (manufactured by BYK-Chemie GmbH under the trade name "BYK 381") with sufficient stirring to obtain a coating solution of adhesive 5.

Coating Solution 6

One mol of tetraethylenepentamine was charged in a vessel type reactor. Then the reactor was heated in a stream of nitrogen to raise the temperature up to 100° C., and 0.40 mol of epoxy resin of diglycidyl ether type of bisphenol A (manufactured by Japan Epoxy Resin Co.,Inc. under the trade name "Epicoat 828") was added dropwise thereto over a period of one hour, followed by stirring for 2 hour. Subsequently, a prescribed amount of methanol was added thereto so as to achieve solid concentration of 40% by weight. Thus there was obtained epoxy resin curing agent D which was an oligomer bearing amide group moiety. There was prepared a solution of 50 parts by weight of epoxy resin of tetraglycidylamine type of meta-xylylenediamine (manufactured by Mitsubishi Gas Chemical Co.,Inc. under the trade name"TETRAD-X") and 144 parts by weight of the epoxy resin curing agent D, each dissolved in a mixed solvent of methanol/ethyl acetate at a ratio of 1:1 ( solid concentration of 30% by weight). To the resultant solution was added 0.02 part by weight of acrylic base wetting agent (manufactured by BYK-Chemie GmbH under the trade name "BYK 381") with sufficient stirring to obtain a coating solution of adhesive 6.

Coating Solution 7

A solution of 50 parts by weight of a polyether component (manufactured by Toyo-Morton Co.,Ltd. under the trade name "TM-329") and 50 parts by weight of an isocyanate component (manufactured by Toyo-Morton Co.,Ltd. under the trade name "CAT-8B") in ethyl acetate (solid concentration of 30% by weight) was sufficiently stirred and mixed to obtain a polyurethane base coating solution of adhesive as a coating solution of adhesive 7 not containing a xylylenediamine unit.

Coating Solution 8

A mixture was prepared by sufficiently stirring and mixing 50 parts by weight of epoxy resin of diglycidyl ether type of bisphenol A (manufactured by Japan Epoxy Resin Co., Inc. under the trade name "Epicoat 828") in place of epoxy resin of tetraglycidylamine type of meta-xylylenediamne and a 27 parts by weight of epoxy resin curing agent D in place of epoxy resin curing agent A to obtain an epoxy base coating solution of adhesive as a coating solution of adhesive 8 not containing a xylylenediamne unit.

Oxygen-absorbing Resin Composition A

Iron powders having an average particle size of 30 micron in an amount of 1000 kg were introduced in a vacuum dryer equipped with a heating jacket, mixed at 140° C. under a reduced pressure of 10 mmHg, subjected to atomization of 50 kg of aqueous solution of 50% by weight of calcium chloride, dried, mixed, and sieved to remove coarse particles to obtain an iron based oxygen-absorbing agent 1 having an average particle size of 30 micron.

Subsequently by the use of a twin screw extruder equipped with a vent, ethylene-propylene random copolymer (manufactured by Chisso Corporation under the trade name "F8090") was extruded, while supplying the extruder with the iron based oxygen-absorbing agent 1 by means of side feeding, so that the ratio by weight of the copolymer to the iron based oxygen-absorbing agent is made to be 70:30. Thus the components were kneaded, extruded through a strand die, cooled and pelletized to obtain the objective oxygen-absorbing resin composition A.

Oxygen-absorbing Resin Composition B

By the use of a twin screw extruder equipped with a vent, linear low density polyethylene (manufactured by Japan Poly-Chem Co.,Ltd. under the trade name "Karnel KC580S", hereinafter referred to as "LLDPE") was extruded, while supplying the extruder by means of side feeding, with the iron based oxygen-absorbing agent 1 so that the ratio by weight of LLDPE to the iron based oxygen-absorbing agent 1 is made to be 70:30. Thus the components were kneaded, extruded through a strand die, cooled and pelletized to obtain the objective oxygen-absorbing resin composition B.

Film 1

By the use of an extrusion laminating apparatus composed of a single screw extruder, T-die, a chill roll, a slitter and a winding unit, the oxygen-absorbing resin composition A manufactured in the foregoing manner in a thickness of 30 micron was extrusion laminated onto non-oriented polypropylene films in a thickness of 50 micron (manufactured by Tohcello Co.,Ltd. under the trade name "RXC-11", hereinafter referred to as "CPP") that were paid out from the let-off gear. The resultant oxygen-absorbing resin layer was subjected to a corona discharge treatment, the CCP and the oxygen-absorbing resin layer were laminated, and thus there was prepared a film 1 consisting of CCP of 50 micron/ oxygen-absorbing resin layer of 30 micron. The resultant film 1 had a wetting tension (JIS K6768) of 42 dyne/cm on the surface of the oxygen-absorbing resin layer.

Film 2

In the same manner as in the preceding item, the oxygen-absorbing resin composition B manufactured in the foregoing manner with a thickness of 30 micron was extrusion laminated onto the back side of the surface subjected to a corona discharge treatment in a colorless LLDPE films in a thickness of 30 micron (manufactured by Tohcello Co.,Ltd. under the trade name "TCS") that were paid out from the let-off gear. Further, the resin in which linear LLDPE (manufactured by Dow Chemical Co., Ltd. under the trade name "PT1450") was incorporated with 10% by weight of titanium dioxide was laminated in a thickness of 20 micron on the resultant oxygen-absorbing resin layer to prepare a film 2 consisting of LLDPE of 30 micron/oxygen-absorbing resin layer of 30 micron/titanium dioxide-containing LLDPE of 20 micron. The resultant film 2 had a wetting tension (JIS K6768) of 40 dyne/cm on the surface of the colorless polyethylene film.

EXAMPLE 1

The coating solution 1 was applied onto an oriented polypropylene film (manufactured by Toyobo Co.,Ltd. under the trade name "PYLEN", hereinafter referred to as "OPP") with a thickness of 20 micron in a coating amount of 3 g/m² expressed in terms of solid content by the use of a bar coater No. 3. The resultant coated film was dried at 80° C. for 30 seconds, then laminated with the film 2 by means of a nipple roll, and subjected to aging at 35° C. for one day to prepare a laminated film consisting of OPP of 20 micron/ adhesive layer of 10 micron I LLDPE of 30 micron/oxygen-absorbing layer of 30 micron/titanium dioxide-containing LLDPE of 20 micron. The adhesive layer had a content of xylylenediamine unit (N—$CH_2$—$C_6H_4$—$CH_2$—N) of 62.4% by weight.

{Evaluation test}

By the use of the laminated film thus obtained, there was prepared a bag which measured 130 mm/100 mm in size and was sealed on three sides. Two steamed rice cakes each cut into a rectangular parallelopiped-like shape with 50 g each was packed in the bag, which was hermetically sealed. The rice cakes were preserved at 23° C. and a relative humidity of 60%, and examined for oxygen concentration in the bag on the third day from the start of the preservation and for the external appearance of the rice cakes on the seventh day from the start thereof. In addition, a measurement was made of the laminate strength in g/15 mm of the laminated film through the method as prescribed by JIS K6854 at a peeling velocity of 100 mm min by using a T type peeling test. The results are given in Table 1.

EXAMPLE 2

The procedure in Example 1 was repeated to prepare a laminated film except that the coating solution 2 was used in place of the coating solution 1. The resultant adhesive layer had a content of xylylenediamine unit (N—$CH_2$—$C_6H_4$—$CH_2$—N) of 61.9% by weight. Subsequently, the evaluation test was carried out in the same manner as in Example 1. The results are given also in Table 1.

EXAMPLE 3

The procedure in Example 1 was repeated to prepare a laminated film except that the coating solution 3 was used in place of the coating solution 1. The resultant adhesive layer had a content of xylylenediamine unit (N—$CH_2$—$C_6H_4$—$CH_2$—N) of 59.8% by weight. Subsequently, the evaluation test was carried out in the same manner as in Example 1. The results are given also in Table 1.

EXAMPLE 4

The procedure in Example 1 was repeated to prepare a laminated film except that the coating solution 4 was used in place of the coating solution 1. The resultant adhesive layer had a content of xylylenediamine unit (N—$CH_2$—$C_6H_4$—$CH_2$—N) of 60.6% by weight. Subsequently, the evaluation test was carried out in the same manner as in Example 1. The results are given also in Table 1.

EXAMPLE 5

The procedure in Example 1 was repeated to prepare a laminated film except that the coating solution 5 was used in place of the coating solution 1. The resultant adhesive layer had a content of xylylenediamine unit (N—$CH_2$—$CH_4$—$CH_2$—N) of 43.0% by weight. Subsequently, the evaluation test was carried out in the same manner as in Example 1. The results are given also in Table 1.

COMPARATIVE EXAMPLE 1

The procedure in Example 1 was repeated to prepare a laminated film except that the coating solution 6 was used in place of the coating solution 1. The resultant adhesive layer had a content of xylylenediamine unit (N—$CH_2$—$CH_4$—$CH_2$—N) of 9.5% by weight. Subsequently, the evaluation test was carried out in the same manner as in Example 1. The results are given also in Table 1.

COMPARATIVE EXAMPLE 2

The procedure in Example 1 was repeated to prepare a laminated film except that the coating solution 7 not containing a xylylenediamine unit (N—$CH_2$—$C_6H_4$—$CH_2$—N) was used in place of the coating solution 1. Subsequently, the evaluation test was carried out in the same manner as in Example 1. The results are given also in Table 1.

COMPARATIVE EXAMPLE 3

The procedure in Example 1 was repeated to prepare a laminated film except that the coating solution 8 not containing a xylylenediamine unit (N—$CH_2$—$C_6H_4$—$CH_2$—N) was used in place of the coating solution 1. Subsequently, the evaluation test was carried out in the same manner as in Example 1. The results are given also in Table 1.

TABLE 1

|  | Content of xylylene-diamine unit (wt %) | Conc. of oxygen on 3rd day (vol %) | Appearance of steamed rice cake on 7th day | Laminate strength of laminated film (g/15 mm) |
| --- | --- | --- | --- | --- |
| Example 1 | 62.4 | <0.1 | normal | 950 |
| Example 2 | 61.9 | <0.1 | normal | 950 |
| Example 3 | 59.8 | <0.1 | normal | 980 |
| Example 4 | 60.6 | <0.1 | normal | 1080 |
| Example 5 | 43.0 | <0.1 | normal | 1100 |
| Comparative Example 1 | 9.5 | 0.8 | mildewed | 1130 |
| Comparative Example 2 | 0 | 4.3 | mildewed | 960 |
| Comparative Example 3 | 0 | 6.0 | mildewed | 80 |

EXAMPLE 6

The coating solution 1 was applied onto a printed Polyethylene terephthalate (PET) film with a thickness of 12 micron. The coated film was laminated with an oriented nylon 6 film with a thickness of 15 micron by the procedure as in Example 1. Then, the oriented nylon 6 film was coated on the surface with the coating solution in Example 1, and laminated on the oxygen-absorbing layer face of the film 1 in the same laminating procedure as in Example 1 to obtain oxygen-absorbing multi-layer film consisting of PET/oriented nylon 6 film/oxygen-absorbing layer/CPP film having a total thickness of approximately 117 micron with a thickness of the adhesive layer being 10 micron.

By using the oxygen-absorbing multi-layer film, there was prepared a standing pouch having two side films and measuring 130 mm/160 mm in size. Using an automatic filling machine equipped with a mechanism of opening the standing pouch by feeding air, 150 g of vegetable soup was packed therein through the opening portion of the standing pouch thus prepared. The pouch was hermetically sealed, while leaving 10 cc of air in the head space thereof. Then the pouch filled with vegetable soup was subjected to retort treatment at 120° C. and for 30 minutes. Thereafter oxygen concentration in the pouch was examined to evaluate the performance, The results are given in Table 2.

EXAMPLE 7

The procedure in Example 6 was repeated to prepare an oxygen-absorbing multi-layer film and evaluate the performance of the multi-layer film thus prepared except that the coating solution 2 was used in place of the coating solution 1. The results are given also in Table 2.

EXAMPLE 8

The procedure in Example 6 was repeated to prepare an oxygen-absorbing multi-layer film and evaluate the performance of the multi-layer film thus prepared except that the coating solution 3 was used in place of the coating solution 1. The results are given also in Table 2.

EXAMPLE 9

The procedure in Example 6 was repeated to prepare an oxygen-absorbing multi-layer film and evaluate the performance of the multi-layer film thus prepared except that the coating solution 4 was used in place of the coating solution 1. The results are given also in Table 2.

EXAMPLE 10

The procedure in Example 6 was repeated to prepare an oxygen-absorbing multi-layer film and evaluate the performance of the multi-layer film thus prepared except that the coating solution 5 was used in place of the coating solution 1. The results are given also in Table 2.

COMPARATIVE EXAMPLE 4

The procedure in Example 6 was repeated to prepare an oxygen-absorbing multi-layer film and evaluate the performance of the multi-layer film thus prepared except that use was made of, as the coating solution of polyurethane based adhesive, a solution of 50 parts by weight of a polyether component (manufactured by Toyo-Morton Co.,Ltd. under the trade name "TM-329") and 50 parts by weight of a polyisocyanate component (manufactured by Toyo-Morton Co.,Ltd. under the trade name "CAT-8B") in ethyl acetate (solid concentration of 30% by weight) in place of the coating solution in Example 6, and use was made of an ethylene-vinyl alcohol copolymer layer with a thickness of 15 micron (manufactured by Kuraray Co.,Ltd. under the trade name "Eval EF-CR") as the barrier layer between the oriented nylon 6 layer and the oxygen-absorbing layer. The film constitution was PET layer/printing layer/oriented nylon 6 layer lethylene-vinyl alcohol copolymer layer/ oxygen-absorbing layer/CPP layer having a total thickness of approximately 130 micron. The results of evaluating the performance of the multi-layer film in the same manner as in Example 6 are given in Table 2.

In summarizing the performance results of the examples and comparative examples, the film obtained in any of Examples 6 to 10 had a small thickness, had flexibility and enabled an article to be easily packed therein when made into a bag type container, whereas the films obtained in Comparative Example 4 had a large thickness, caused difficulty in opening the standing pouch made therefrom, and was unfavorable in the workability of packing an article.

TABLE 2

| | Approx.-thickness of multi-layer film (micron) | Oxygen conc. in bag (vol %) | Workability of packing contents (soup) |
|---|---|---|---|
| Example 6 | 117 | <0.1 | good |
| Example 7 | 117 | <0.1 | good |
| Example 8 | 117 | <0.1 | good |
| Example 9 | 117 | <0.1 | good |
| Example 10 | 117 | <0.1 | good |
| Comparative Example 4 | 130 | not measured | no-good |

What is claimed is:

1. An oxygen-absorbing multi-layer film which comprises, in order, an outer layer comprising a thermoplastic resin; an adhesive layer comprising cured epoxy resin composition; an oxygen-absorbing layer comprising a thermoplastic resin and an iron based oxygen-absorbing agent incorporated therein; and a heat sealing layer comprising an oxygen-permeable thermoplastic resin, wherein said adhesive layer comprises a gas barrier cured epoxy resin composition containing at least 40% by weight of a xylylenediamine unit ($N-CH_2-C_6H_4-CH_2-N$), based on the weight of the cured epoxy resin, and wherein said gas barrier cured epoxy resin composition is formed by curing an epoxy resin with an epoxy resin curing agent.

2. The oxygen-absorbing multi-layer film according to claim 1, wherein said epoxy resin contains a xylylenediamine unit.

3. The oxygen-absorbing multi-layer film according to claim 1, wherein, said epoxy resin curing agent contains a xylylenediamine unit.

4. The oxygen-absorbing multi-layer film according to claim 1, wherein said epoxy resin and said epoxy resin curing agent each contain a xylylenediamine unit.

5. The oxygen-absorbing multi-layer film according to claim 1, wherein the xylylenediamine unit is meta-xylylenediamine unit or para-xylylenediamine unit.

6. The oxygen-absorbing multi-layer film according to claim 1, wherein the adhesive layer comprises a gas barrier cured epoxy resin composition containing 40 to 90% by weight of a xylylenediamine unit.

7. The oxygen-absorbing multi-layer film according to claim 1, wherein the adhesive layer has a thickness in the range of 0.1 to 20 micron.

8. The oxygen-absorbing multi-layer film according to claim 1, wherein the adhesive layer has a thickness in the range of 0.1 to 10 micron.

9. The oxygen-absorbing multi-layer film according to claim 1, wherein the adhesive layer has an oxygen permeation coefficient under the conditions of a temperature of 23° C. and a relative humidity of 60% being at most 0.1 cc·mm/m$^2$·day·atm.

10. The oxygen-absorbing multi-layer film according to claim 1, wherein the adhesive layer is formed by applying a coating solution comprising the epoxy resin and the epoxy resin curing agent as a coating-forming component onto the surface of the outer layer or the oxygen-absorbing layer each comprising a thermoplastic resin.

11. The oxygen-absorbing multi-layer film according to claim 1, which has not a separate gas barrier layer comprising a thermoplastic resin nor an inorganic material.

12. The oxygen-absorbing multi-layer film according to claim 1, which has an overall thickness of at most 120 micron.

13. The oxygen-absorbing multi-layer film according to claim 1, wherein a printing layer is equipped on the outer layer surface to be coated with the adhesive comprising the cured epoxy resin composition.

14. The oxygen-absorbing multi-layer film according to claim 1, wherein an intermediate layer comprising a thermoplastic resin not containing an oxygen-absorbing agent is installed between the adhesive layer and the oxygen-absorbing layer.

15. The oxygen-absorbing multi-layer film according to claim 1, wherein said gas barrier cured epoxy resin composition contains at least 50% by weight of xylylenediamine unit, based on the weight of the cured epoxy resin.

16. The oxygen-absorbing multi-layer film according to claim 15, wherein said gas barrier cured epoxy resin composition contains 50%–90% by weight of xylylenediamine unit, based on the weight of the cured epoxy resin.

17. The oxygen-absorbing multi-layer film according to claim 1, wherein said epoxy resin has an aromatic ring.

18. The oxygen-absorbing multi-layer film according to claim 1, wherein a terminal of the xylylenediamine unit forms an amide group moiety together with an acyl group.

19. The oxygen-absorbing multi-layer film according to claim 1, wherein said adhesive layer adheres the outer layer and the oxygen-absorbing layer.

20. The oxygen-absorbing multi-layer film according to claim 14, wherein said adhesive layer adheres the outer layer and the oxygen-absorbing layer through said intermediate layer.

* * * * *